US006581205B1

(12) United States Patent
Cochrane et al.

(10) Patent No.: US 6,581,205 B1
(45) Date of Patent: Jun. 17, 2003

(54) INTELLIGENT COMPILATION OF MATERIALIZED VIEW MAINTENANCE FOR QUERY PROCESSING SYSTEMS

(75) Inventors: Roberta Jo Cochrane, Los Gatos, CA (US); Ting Yu Leung, San Jose, CA (US); Chandrasekaran Mohan, San Jose, CA (US); Mir Hamid Pirahesh, San Jose, CA (US); Richard Sefton Sidle, Mountain View, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/464,556

(22) Filed: Dec. 16, 1999

Related U.S. Application Data

(60) Provisional application No. 60/112,881, filed on Dec. 17, 1998.

(51) Int. Cl.[7] .................................................. G06F 9/45
(52) U.S. Cl. ......................... 717/140; 717/140; 707/3; 706/45
(58) Field of Search .................................. 717/106, 115, 717/140, 150, 100, 101, 127; 706/45, 46, 61, 50; 707/3, 4, 5, 101, 200

(56) References Cited

U.S. PATENT DOCUMENTS

| | | | | |
|---|---|---|---|---|
| 5,261,069 A | * | 11/1993 | Wilkinson et al. | 711/145 |
| 5,367,675 A | * | 11/1994 | Cheng et al. | 707/2 |
| 5,388,259 A | * | 2/1995 | Fleischman et al. | 707/5 |
| 5,440,732 A | * | 8/1995 | Lomet et al. | 707/1 |
| 5,481,700 A | * | 1/1996 | Thuraisingham | 707/9 |
| 5,544,355 A | | 8/1996 | Chaudhuri et al. | 707/2 |
| 5,546,570 A | | 8/1996 | McPherson, Jr. et al. | 707/4 |
| 5,963,934 A | * | 10/1999 | Cochrane et al. | 707/2 |
| 5,987,455 A | * | 11/1999 | Cochrane et al. | 707/4 |
| 6,081,801 A | * | 6/2000 | Cochrane et al. | 707/3 |
| 6,339,769 B1 | * | 1/2002 | Cochrane et al. | 707/2 |
| 6,341,288 B1 | * | 1/2002 | Yach et al. | 707/103 |
| 6,353,828 B1 | * | 3/2002 | Ganesh et al. | 707/8 |
| 6,405,368 B1 | * | 6/2002 | Freyburger | 717/140 |
| 6,411,951 B1 | * | 6/2002 | Galindo-Legaria et al. | 707/3 |
| 6,411,964 B1 | * | 6/2002 | Iyer et al. | 707/200 |
| 6,460,027 B1 | * | 10/2002 | Cochrane et al. | 707/2 |

OTHER PUBLICATIONS

Elkan, "Independence of logic database quries and updates", ACM pp 154–160, 1990.*
Hanson, "A performance analysis of view materialization strategies", ACM pp 440–453, 1987.*
Gal, Obsolescent materialized views in query processing of enterprise information systems:, ACM CIKM, pp 367–374, 1999.*
Ross et al, Materialized view maintenance and integrity constrainte checking: trading space for time, ACM SIGMOD, pp 447–458, 1996.*
Lu et al. Efficient maintenance of materialized mediated views, ACM SIGMOD, pp 340–351, 1995.*
Hamid Pirahesh et al., "Extensible/Rule Based Query Rewrite Optimization in Starburst", Proceedings of ACM SIGMOD '92 International Conference on Management of Data, San Diego, CA, [Sigmod record: vol. 21, Issue 20] Jun. 1992, pp. 39–48.

* cited by examiner

*Primary Examiner*—Anil Khatri
(74) *Attorney, Agent, or Firm*—Gates & Cooper LLP

(57) ABSTRACT

A method, apparatus, and article of manufacture for maintaining a materialized view derived from at least one base table in a database stored on a computer. An update is performed to the base table in a transaction. Thereafter, the materialized view is accessed to identify affected records therein using at least one mechanism, such as an isolation level or update- and exclusive-locks, to guarantee consistency while avoiding deadlocks with other transactions that modify at least one base table of the materialized view and to improve concurrency with other transactions that are accessing the materialized view when the modification to the base table is applied to the materialized view.

36 Claims, 5 Drawing Sheets

INTELLIGENT COMPILATION OF MATERIALIZED VIEW MAINTENANCE FOR QUERY PROCESSING SYSTEMS

CROSS-REFERENCE TO RELATED APPLICATIONS

This application claims the benefit under 35 U.S.C §119 (e) of co-pending and commonly-assigned U.S. Provisional application serial No. 60/112,881, entitled "INTELLIGENT COMPILATION OF MATERIALIZED VIEW MAINTENANCE FOR QUERY PROCESSING SYSTEMS," filed on Dec. 17, 1998, by Roberta J. Cochrane, T. Y. Cliff Leung, Chandrasekaran Mohan, Mir Hamid Pirahesh, and Richard S. Sidle, which application is incorporated by reference herein.

BACKGROUND OF THE INVENTION

1. Field of the Invention.

This invention relates in general to database management systems performed by computers, and in particular, to the intelligent compilation of materialized view maintenance for query processing in database management systems.

2. Description of Related Art.

Computer systems incorporating Relational DataBase Management System (RDBMS) software using a Structured Query Language (SQL) interface are well known in the art. The SQL interface has evolved into a standard language for RDBMS software and has been adopted as such by both the American Nationals Standard Institute (ANSI) and the International Standards Organization (ISO).

For most RDBMS software, combinations of tables and views are used to access data stored in tables in the database. A materialized view or summary table is often based on a "full select" against one or more underlying base tables, the results of which are then materialized in the view or table. The columns of the view or table are based on the elements of the select list of the full select.

Generally, the query used to generate the summary table or materialized view condenses, combines, or otherwise processes the data residing in one or more underlying base tables. When the underlying base tables are modified, the materialized view or summary table must also be maintained to accurately reflect the modified tables. In general, modification operations made to the same table are synchronized by the DBMS in order that all transactions retrieve the correct results from the materialized view or summary table. However, in the case of summary tables, such synchronization may lead to frequent deadlocks between transactions, since the summary table usually condenses large amounts of data into relatively few rows. In these cases, most modifications to the underlying base tables will need to modify the same set of rows in the summary table.

To alleviate such potential deadlocks, the isolation level or lock modes can be adjusted in such situations where the summary table is being accessed for the purposes of propagating an update. This is often difficult to achieve in the prior art, because it relies upon the skill and knowledge of the person(s) developing the transactions, to ensure certain parts of a transaction run with the minimally correct level of isolation or obtains the minimal required locks in the transactions, rather than upon any automatic operations of the RDBMS software. Furthermore, the RDBMS software typically overrides any such lock modes or isolation levels requested by the user when modifications are involved. Thus, there is a need in the art for automated mechanisms within the RDBMS software that modify transactions to ensure the correct level of isolation.

SUMMARY OF THE INVENTION

To overcome the limitations in the prior art described above, and to overcome other limitations that will become apparent upon reading and understanding the present specification, the present invention discloses a method, apparatus, and article of manufacture for maintaining a materialized view derived from at least one base table in a database stored on a computer. An update is performed to the base table in a transaction. Thereafter, the materialized view is accessed to identify affected records therein using at least one mechanism, such as an isolation level or update- and exclusive-locks, to guarantee consistency while avoiding deadlocks with other transactions that modify at least one base table of the materialized view and to improve concurrency with other transactions that are accessing the materialized view when the modification to the base table is applied to the materialized view.

It is an object of the present invention to optimize queries using materialized views that can be replicated and/or partitioned across multiple processors. More specifically, it is an object of the present invention to the maintenance of materialized views or summary tables in an RDBMS.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown byway of illustration a specific embodiment in which the invention may be practiced. It is to be understood that other embodiments may be utilized and structural and functional changes may be made without departing from the scope of the present invention.

HARDWARE ENVIRONMENT

Figure 1:
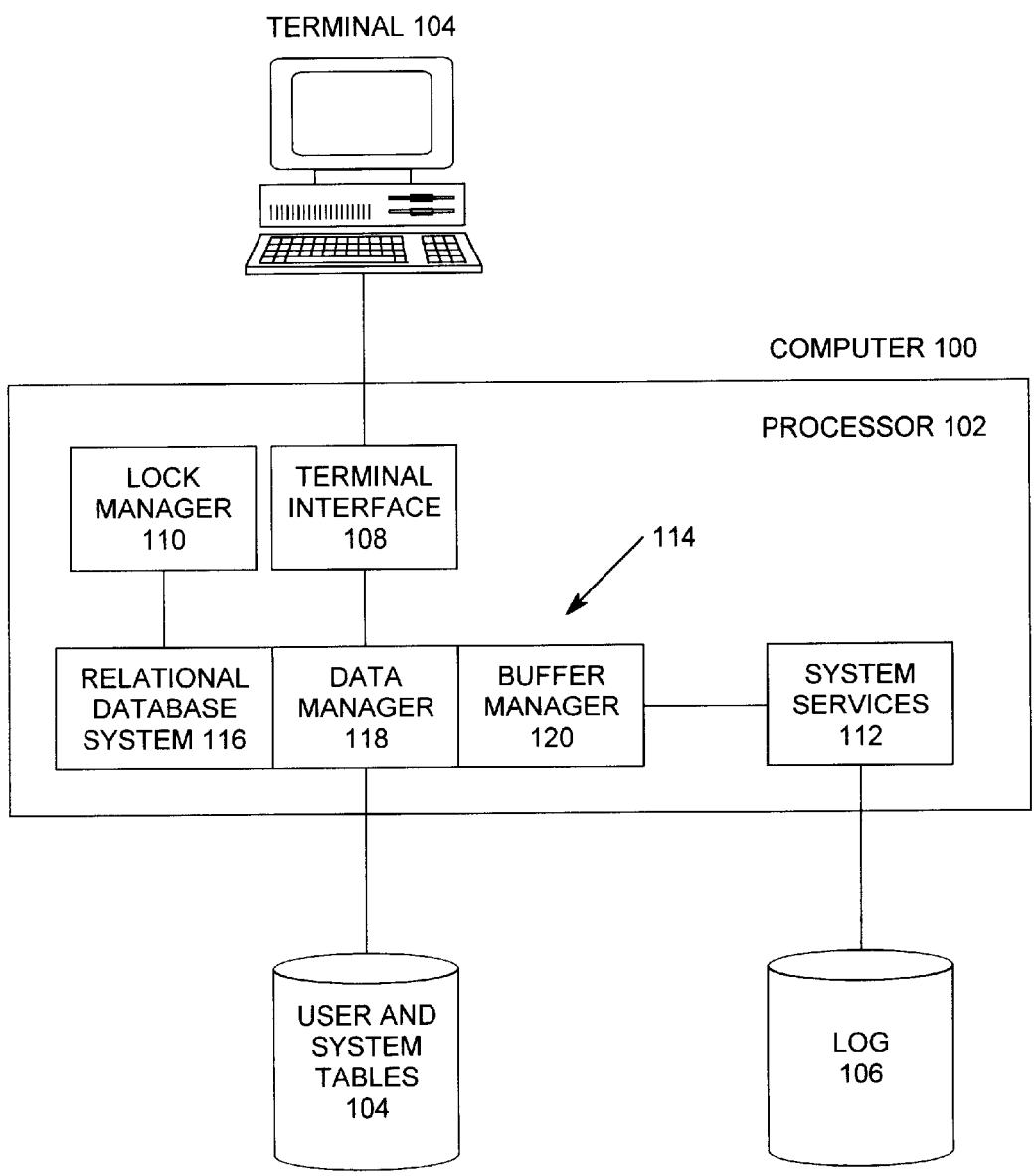
FIG. 1 illustrates an exemplary computer hardware environment that could be used with the preferred embodiment of the present invention.

FIG. 1 illustrates an exemplary hardware environment that could be used with the present invention. In the exemplary environment, a computer system 100 is comprised of one or more processors 102 connected to one or more data storage devices 104 and 106 that store one or more relational databases. Each of the processors 102 in the computer system 100 execute one or more threads of a relational database management system (RDBMS), so that processing functions are divided among the processors 102.

Operators of the computer system 100 use a standard operator interface 108, such as IMS/DB/DC, CICS, TSO, OS/2 or other similar interface, to transmit electrical signals to and from the computer system 100 that represent commands for performing various search and retrieval functions, termed queries, against the databases. In the present invention, these queries conform to the Structured Query Language (SQL) standard, and invoke functions performed by the RDBMS. In the preferred embodiment of the present invention, the RDBMS comprises the DB2 product offered by IBM for the MVS or OS/2 operating systems, although those skilled in the art will recognize that the present invention has application to any RDBMS.

As illustrated in FIG. 1, the RDBMS includes three major components: the Resource Lock Manager (IRLM 110, the Systems Services module 112, and the Database Services module 114. The IRLM 110 handles locking services, because the RDBMS software treats data as a shared resource, thereby allowing any number of users to access the same data simultaneously, and thus concurrency control is required to isolate users and to maintain data integrity. The Systems Services module 112 controls the overall RDBMS execution environment, including managing log data sets 106, gathering statistics, handling startup and shutdown, and providing management support.

At the heart of the RDBMS is the Database Services module 114. The Database Services module 114 contains several submodules, including the Relational Database System (RDS) 116, the Data Manager 118, and the Buffer Manager 120, as well as other elements such as an SQL compiler/interpreter. These submodules support the functions of the SQL language, i.e., definition, access control, retrieval, and update of user and system data.

Generally, the RDBMS comprises instructions and/or data that is embodied in or retrievable from a computer-readable device, medium, or carrier, e.g., a fixed or removable data storage device 104, a remote device coupled to the computer system 100 by a data communications device, etc. Moreover, these instructions and/or data, when read, executed, and/or interpreted by the computer system 100, cause the computer system 100 to perform the steps necessary to implement and/or use the present invention.

Thus, the present invention may be implemented as a method, apparatus, or article of manufacture using standard programming and/or engineering techniques to produce software, firmware, hardware, or any combination thereof. The term "article of manufacture", or alternatively, "computer program carrier", as used herein is intended to encompass logic or instructions accessible from any computer-readable device, carrier, or media. Of course, those skilled in the art will recognize many modifications may be made to this configuration without departing from the scope of the present invention.

Those skilled in the art will recognize that any combination of the above components, or any number of different components, including computer programs, peripherals, and other devices, may be used to implement the present invention, so long as similar functions are performed thereby.

INTERACTIVE SQL EXECUTION

Figure 2:
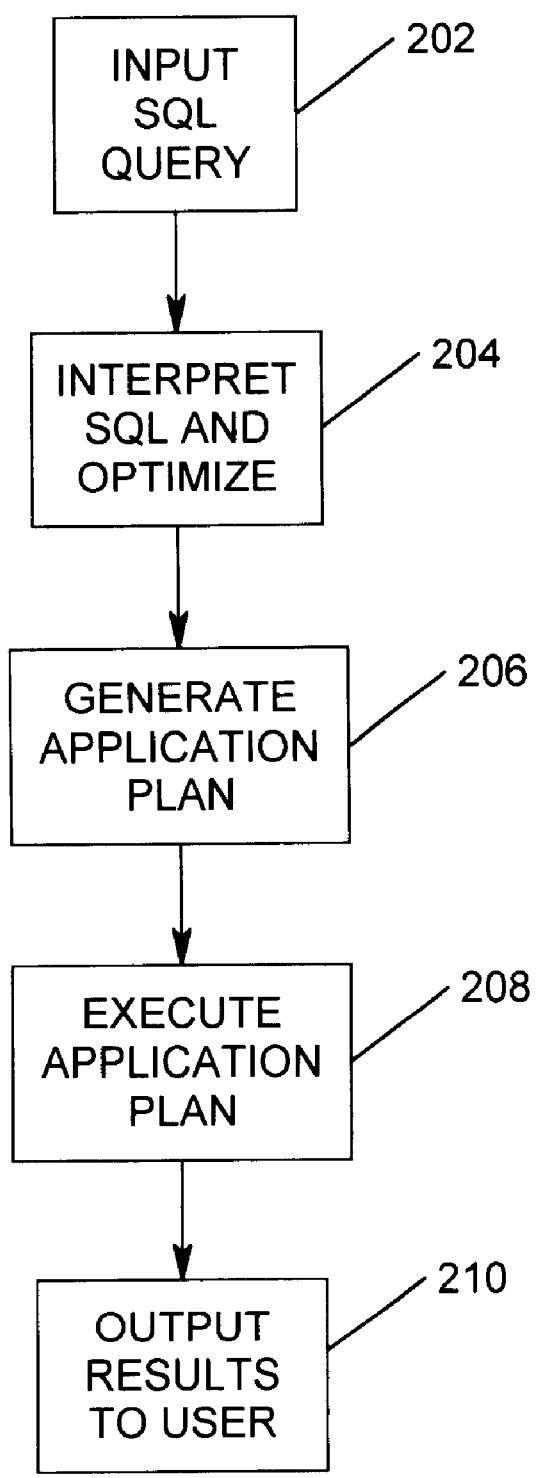
FIG. 2 is a flowchart illustrating the steps necessary for the interpretation and execution of SQL statements in an interactive environment according to the preferred embodiment of the present invention.

FIG. 2 is a flowchart illustrating the steps necessary for the interpretation and execution of SQL statements in an interactive environment according to the preferred embodiment of the present invention. Block 202 represents the input of SQL statements into the computer system 100. Block 204 represents the step of compiling or interpreting the SQL statements. An optimization function within block 204 may transform or optimize the SQL query in a manner described in more detail later in this specification. Block 206 represents the step of generating a compiled set of runtime structures called an application plan from the compiled SQL statements. Generally, the SQL statements received as input specify only the desired data, but not how to retrieve the data. This step considers both the available access paths (indexes, sequential reads, etc.) and system held statistics on the data to be accessed (the size of the table, the number of distinct values in a particular column, etc.), to choose what it considers to be the most efficient access path for the query. Block 208 represents the execution of the application plan, and block 210 represents the output of the results.

EMBEDDED/BATCH SQL EXECUTION

Figure 3:
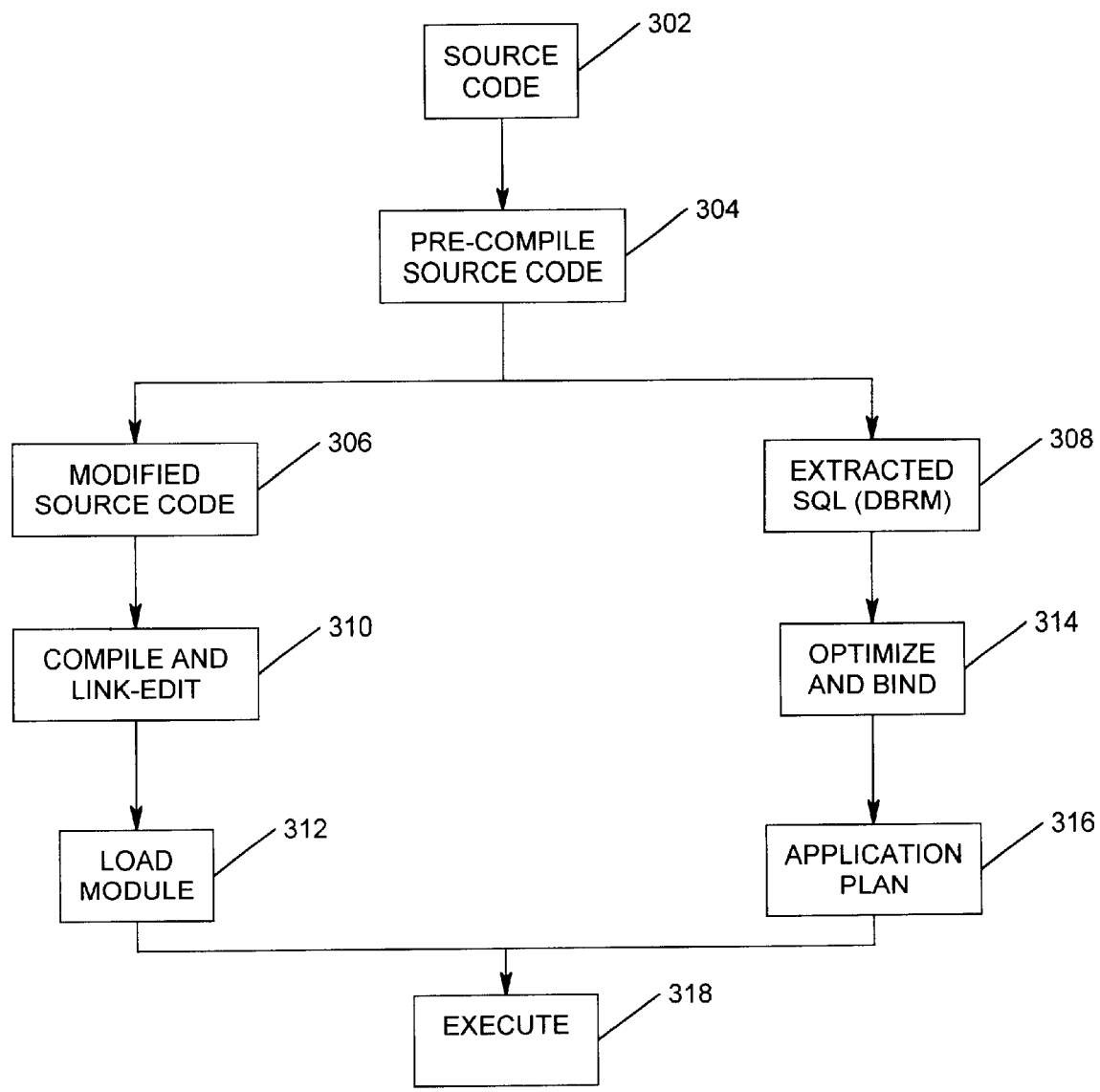
FIG. 3 is a flowchart illustrating the steps necessary for the interpretation and execution of SQL statements embedded in source code according to the preferred embodiment of the present invention.

FIG. 3 is a flowchart illustrating the steps necessary for the interpretation and execution of SQL statements embedded in source code according to the preferred embodiment of the present invention. Block 302 represents program source code containing a host language (such as COBOL or C) and embedded SQL statements. The program source code is then input to a pre-compile step 304. There are two outputs from the pre-compile step 304: a modified source module 306 and a Database Request Module (DBRM) 308. The modified source module 306 contains host language calls to the RDBMS, which the pre-compile step 304 inserts in place of SQL statements. The DBRM 308 is comprised of the SQL statements from the program source code 302. A compile and link-edit step 310 uses the modified source module 306 to produce a load module 312, while an optimize and bind step 314 uses the DBRM 308 to produce a compiled set of runtime structures for the application plan 316. As indicated above in conjunction with FIG. 2, the SQL statements from the program source code 302 specify only the desired data, but not how to retrieve the data. The optimize and bind step 314 may reorder or optimize the SQL query in a manner described in more detail later in this specification. Thereafter, the optimize and bind step 314 considers both the available access paths (indexes, sequential reads, etc.) and system held statistics on the data to be accessed (the size of the table, the number of distinct values in a particular column, etc.), to choose what it considers to be the most efficient access path for the query. The load module 312 and application plan 316 are then executed together at step 318.

DESCRIPTION OF THE OPTIMIZATION TECHNIQUE

The present invention discloses an improved optimization technique that is typically performed at step 204 of FIG. 2 or step 314 of FIG. 3. Specifically, the present invention discloses an improved SQL query compilation and optimization technique.

Figure 4:
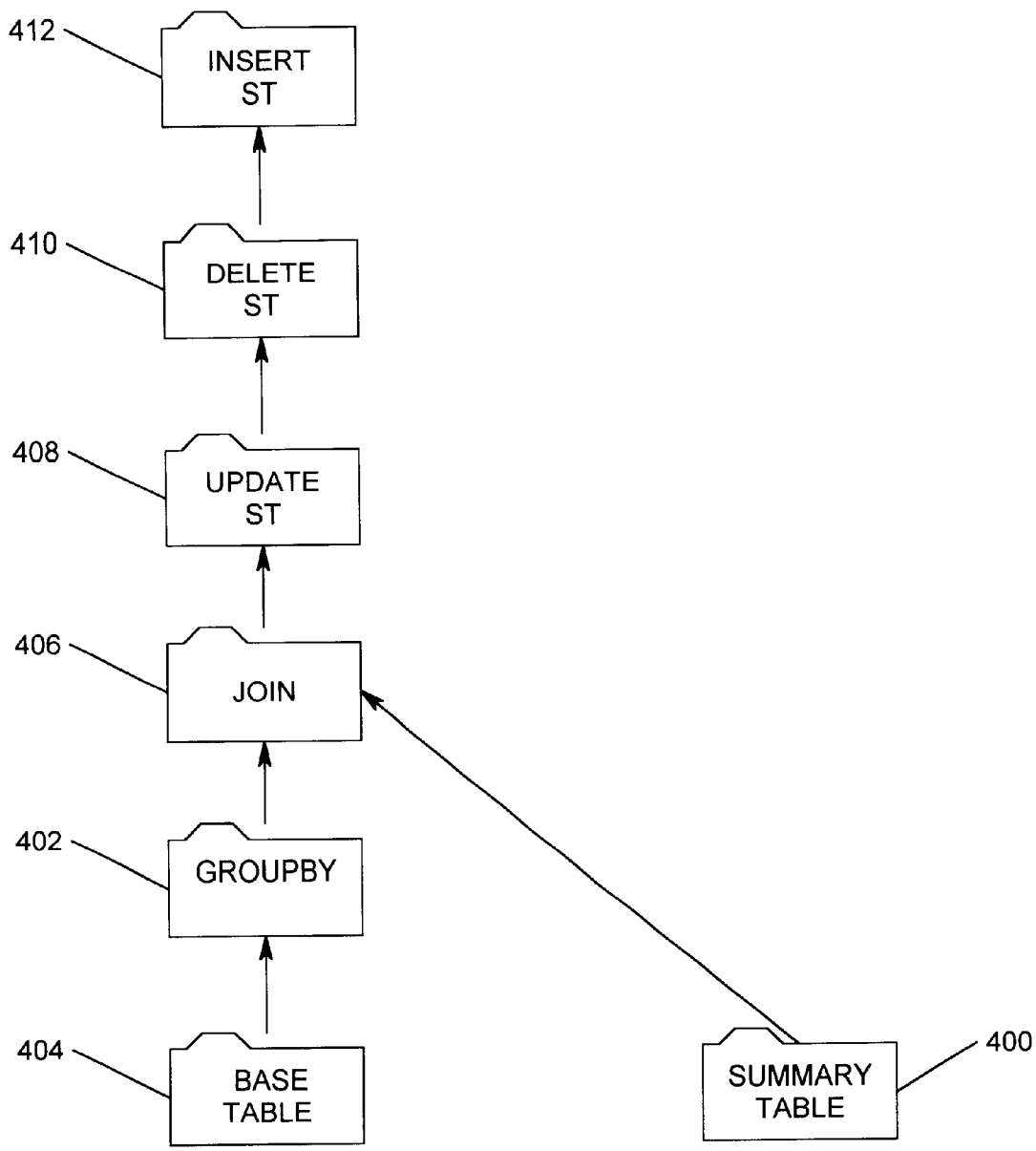
FIG. 4 is a block diagram that illustrates a Query Graph Model representation for various SQL operations used in the preferred embodiment of the present invention.

The problem solved by the present invention can best be illustrated using a Query Graph Model (QGM), as illustrated in FIG. 4. A QGM represents a semi-procedural dataflow graph of a query, wherein the QGM is basically a high-level, graphical representation of the query. Boxes are used to represent relational operations, while arcs between boxes are used to represent quantifiers, i.e., table references. The basic set of boxes include those for SELECT, GROUP BY, UPDATE, DELETE, and INSERT. A join operation is represented by a SELECT box with two or more input quantifiers.

Many SQL query compilation and optimization techniques using the Query Graph Model (QGM) have been performed in the prior art, as disclosed in the publication, Hamid Pirahesh, Joseph Hellerstein, and Waqar Hasan, "Extensible/Rule Based Query Rewrite Optimization in STARBURST," Proceedings of ACM SIGMOD '92 International Conference on Management of Data, San Diego, Calif., 1992, which is incorporated by reference herein.

FIG. 4 is a QGM that illustrates the operation of the present invention. Summary tables 400 (or materialized views) are based on the results of a specification query 402 that condenses, combines, or otherwise processes one or more underlying base tables 404. When the underlying base tables 404 are modified, the summary table 400 must also be maintained to accurately reflect the modified tables. The results of the specification query 402 are joined 406 to the summary table 400 to determine whether an UPDATE 408, DELETE 410, or INSERT 412 operation is required to maintain the summary table 400.

In most RDBMS environments, modifications and accesses to tables by multiple transactions can occur concurrently. The RDBMS guarantees consistency based on the programmer-defined isolation level of the transaction, i.e., cursor-stability, repeatable-read, etc., as well as the use of S-locks (shared locks), U-locks (update locks), and X-locks (exclusive locks). For transactions that modify tables in the database, a higher level of consistency is generally required than for any transaction that does not modify tables in the database. However, for maintaining materialized views that condense multiple records into one record, the standard isolation levels can lead to reduced concurrency for other transactions that are only accessing the materialized view and frequent deadlocks for other transactions that are also modifying the underlying base tables of the materialized view and propagating these changes to the materialized views.

The operation of the present invention can best be understood in context, i.e., using an example, such as an application performed by the RDBMS. Consider the following example:

MV:
SELECT A, SUM(SALES)
FROM T
GROUP BY A

The above operation creates a materialized view (MV) This materialized view must be maintained if the underlying base table is modified.

Consider the following example:
UPDATE T
SET A=3
WHERE A=2.

The above operation deletes a group where A=2 from MV. If MV already had a group where A=3, it will add to this result; otherwise, it will insert a new row into MV for the group where A=3.

To determine whether an insert or update is required, a DELTA-T table may be created containing two rows: one to delete group A=2 and the other to insert/update group A=3. DELTA-T may then be outerjoined with MV, with MV as the null producing side of the outerjoin. If a row does not join with MV, then the group with A=3 does not already exist.

A problem arises if, in the process of deciding to perform an insert/update, some other transaction also decides that it should insert a row with group A=3 into MV, and both transactions are accessing MV through an index. To determine if A=3 exists, both transactions obtain S-locks on the next-key. To perform the insert/update, both transactions attempt to obtain X-locks and would be blocked by each other's S-locks, thereby resulting in a deadlock situation. Since materialized views or summary tables often significantly condense large amounts of data (e.g., summarizing an entire year's data in one row), such collisions would be expected to occur frequently.

In order to avoid this situation, the present invention forces each transaction to obtain an U-lock when performing the outerjoin. If there is no other restrictive predicate that would preclude an inevitable modification, the present invention also forces each transaction to obtain an X-lock at the time the outerjoin is performed.

Consider the following materialized view (MV):
MV:
SELECT A, SUM(SALES) AS S, COUNT(*) AS C
FROM T
GROUP BY A Assume that a number of rows are inserted into T, wherein these rows are denoted as DELTA-T. There are two possible effects on MV, depending on the value of column A after the grouping on column A:

1) If a new group is introduced to MV (i.e., the value of A in DELTA-T does not appear in MV), then the new group must be inserted into MV. Effectively, this is done via an insert operation, as follows:

INSERT INTO MV
SELECT Q.A, Q.S, Q.C
FROM TABLE (SELECT A, SUM(SALES) AS S,
  COUNT(*) AS C
  FROM DELTA-T
  GROUP BY A) AS Q(A,S,C)
WHERE NOT EXISTS (SELECT
  FROM MV
  WHERE Q.A=MV.A)

2) If the group exists in MV, then the corresponding aggregate values must be updated. Effectively, this done via an update operation, as follows:

UPDATE MV V
SET (S,C)=(SELECT V.S+Q.S,V.C+Q.C
FROM TABLE (SELECT A, SUM(SALES) AS S,
  COUNT(*) AS C
  FROM DELTA-T
  GROUP BY A) AS Q(A,S,C)
WHERE V.A=Q.A)
WHERE V.A IN (SELECT A
  FROM DELTA-T
  GROUP BY A)

The first operation, the INSERT, returns any non-matching groups, whereas the second operation, the UPDATE, returns all matching groups. These two operations can be combined together into an outerjoin, which returns both matching and non-matching pairs.

Consider the output of the following outerjoin:
OJ:
SELECT Q.A, Q.S, Q.C, MV.C AS INDICATOR
FROM TABLE (SELECT A, SUM(SALES) AS S,
  COUNT(*) AS C
  FROM DELTA-T
  GROUP BY A) AS Q(A,S,C)
LEFT JOIN MV ON Q.A=MV.A That is, the DELTA-T is first grouped on column A, and then an outerjoin is performed with MV. The derived table Q(A,S,) is the tuple-preserving operand, whereas MV is the null-producing operand. With the outerjoin operation, both matching as well as non-matching rows with respect to the grouping column A of the DELTA-T are returned. By definition of the outerjoin, the output column MV.C (null-producing operand) is null when there is a row in Q(A,S,C) that does not have a matching value of A in MV.

Hence, the value in MV.C can be used as an indicator to separate out the matching and non-matching rows.

MATCHING ROWS:
SELECT A, S, C
FROM OJ
WHERE INDICATOR IS NOT NULL
NON-MATCHING ROWS:
SELECT A, S, C
FROM OJ
WHERE INDICATOR IS NULL

As a result, both the matching and non-matching pairs can be computed in a single operation using an outerjoin.

Assume that Transaction #1 and Transaction #2 insert new records into T with data for 1998, and the year is the GROUPBY column for the materialized view. Both Transaction #1 and Transaction #2 will read the materialized view to test for existence of a group, i.e., record, for 1998. If the group exists, then both Transaction #1 and Transaction #2 will compute incremental maintenance for the aggregations for 1998 based on the current value of the materialized view. If neither group exists, then Transaction #1 and Transaction #2 will continue to insert a row into the materialized view with only their values added to the group. Following are some possible error scenarios.

Consider the following Scenario #1. Assume that Transaction #1 reads the materialized view, discovers that 1998 record does not exist, and obtains an S-lock on either the next-key (e.g., 1999 record) or EOF (end-of-file) if the next-key does not exist. Transaction #1 then computes a value for the 1998 record based on Transaction #1 transition values (e.g., the set of inserted rows). Following these steps, Transaction #1 obtains an X-lock on the next-key or EOF in the materialized view, inserts the new 1998 record into the materialized view, and commits and releases both the S- and X-locks. Transaction #2 then reads the materialized view, sees the 1998 record, obtains an S-lock on the 1998 record in the materialized view, and computes a new value for the 1998 record based on the current value in the materialized view and Transaction #2 transition values. Following these steps, Transaction #2 obtains an X-lock on the 1998 record, updates the 1998 record, commits and releases both the S- and X-locks. Note that these steps lead to a correct execution.

Consider the following Scenario #2. Assume that Transaction #1 reads the materialized view, discovers that the 1998 record does not exist, and obtains an S-lock on either the next-key (e.g., the 1999 record) or EOF if the next-key does not exist. Transaction #1 then computes a value for the 1998 record based on Transaction #1 transition values. Transaction #2 then reads the materialized view, discovers that the 1998 record does not exist, and obtains an S-lock on either the next-key or EOF. In this scenario, this S-lock is shared with Transaction #1. Transactions #2 computes a new value for the 1998 record based on Transaction #2 transition values. Transaction #1 requests an X-lock on the next-key or EOF in the materialized view, and waits for Transaction #2 to release its S-lock However, Transaction #2 requests an X-lock on the next-key or EOF in the materialized view and waits for Transaction #1 to release its S-lock Note that this scenario may lead to a deadlock, and even if deadlock does not occur, it would still produce wrong answers, since the values for the maintenance are computed by each transaction independent of the other. This scenario would also occur with the last actions of Transaction #1 and Transaction #2 reversed as well. In this scenario, the deadlock is guaranteed if the S-locks acquired by the two transactions are retained for the duration of the insert statements. The S-locks will be retained under repeatable read isolation level but they may not be retained under cursor stability isolation level. Hence, isolation level repeatable read is required for correct answers in this scenario.

Consider the following Scenario #3. Transaction #1 reads the materialized view, discovers that the 1998 record exists, obtains an S-lock on the 1998 record in the materialized view, and computes a value for the 1998 record based on current value in the materialized view and Transaction #1 transition values. Transaction #1 then obtains an X-lock on the 1998 record in the materialized view, updates the 1998 record, commits and release both the S- and X-locks. Transaction #2 reads the materialized view, sees the 1998 record with the changes from Transaction #1, obtains an S-lock on the 1998 record, and computes a new value for the 1998 record based on the current value in the materialized view and Transaction #2 transition values. Transaction #2 then obtains an X-lock on the 1998 record, updates the 1998 record, commits and releases both the S- and X-locks. Note that this scenario produces correct results.

Consider the following Scenario #4. Transaction #1 reads the materialized view, discovers that the 1998 record exists, obtains an S-lock on the 1998 record, and computes the value for the 1998 record based on current value in the materialized view and Transaction #1 transition values. Transaction #2 reads the materialized view, sees the 1998 record without the changes from Transaction #1, obtains an S-lock on the 1998 record and computes the new value for the 1998 record based on the current value in the materialized view and Transaction #2 transition values. Transaction #1 requests an X-lock on the 1998 record in the materialized view and has to wait for Transaction #2 to release its S-lock Transaction #2 requests an X-lock on the 1998 record and has to wait for Transaction #1 to release its S-lock Again, scenario #4 may result in deadlock Even if it did not, it would incorrectly update the materialized view. The problem with Scenarios #2 and #4 is that Transaction #2 is allowed to read the 1998 record, or the lack of this record, from the materialized view, while Transaction #1 has already used this value, or the lack of this value, to compute the new aggregate for the materialized view. The deadlock prevents inconsistent data, but is not useful in practical terms.

Since many data warehouse applications will perform parallel appends of data from the same group, these deadlocks are likely to be common. The solution according to the present invention is to have the transactions Transaction #1 and Transaction #2 acquire U-locks on the 1998 record or its next key when they read the materialized view to determine the existence of the group. The U-lock is compatible with S-locks, but not with other U-locks. Therefore, it allows other transactions to read from the materialized view, while synchronizing the reads of two transactions.that update the materialized view.

Hence, the above scenarios are converted to the following new scenarios by the present invention:

Consider Scenario #1a as a replacement for Scenario #1. Transaction #1 reads the materialized view, discovers that the 1998 record does not exist, and obtains an U-lock on either the next-key (e.g., the 1999 record) or EOF if the next-key does not exist. Transaction #1 then computes the value for the 1998 record based on Transaction #1 transition values. Transaction #1 obtains an X-lock on the next-key or EOF in the materialized view, inserts the new record into the materialized view, commits.and releases its U- and X-locks. Transaction #2 reads the materialized view, sees the 1998 record, obtains an U-lock on the 1998 record in the materialized view, and computes the new value for the 1998 record based on the current value in the materialized view and Transaction #2 transition values. Transaction #2 obtains an X-lock on the 1998 record, updates the 1998 record, commits and releases its U- and X-locks. This the same essential execution pattern as Scenario #1.

Consider Scenario #2a as a replacement for Scenario #2. Transaction #1 reads the materialized view, discovers that the 1998 record does not exist, and obtains an U-lock on either the next-key (e.g., the 1999 record) or EOF if the next-key does not exist. Transaction #1 then computes the value for the 1998 record based on Transaction #1 transition values. Transaction #2 requests an U-lock on the 1998 record or the next-key, and thus must wait on Transaction #1. Transaction #1 obtains an X-lock on the next-key or EOF in the materialized view, inserts the new record into the materialized view, commits and releases its U- and X-locks. Transaction #2 reads the materialized view, sees the 1998 record, obtains an U-lock on the 1998 record in the materialized view, and computes the new value for the 1998 record based on the current value in the materialized view and Transaction #2 transition values. Transaction #2 obtains an X-lock on the 1998 record, updates the 1998 record, commits and releases its U- and X-locks. Note that this scenario leads to correct results since Transaction #2 sees the results of Transaction #1 in its computation of the new values for the 1998 record. It essentially forces the execution of Scenarios #1 and #1a.

Consider Scenario #3a as a replacement for Scenario #3. Transaction #1 reads the materialized view, discovers that the 1998 record exists, obtains an U-lock on the 1998 record in the materialized view, and computes the value for the 1998 record based on the current value in the materialized view and Transaction #1 transition values. Transaction #1 then obtains an X-lock on the 1998 record in the materialized view, updates the 1998 record, commits and releases its U- and X-locks. Transaction #2 reads the materialized view, sees the 1998 record with the changes from Transaction #1, obtains an U-lock on the 1998 record in the materialized view, computes a new value for the 1998 record based on the current value in the materialized view and Transaction #2 transition values. Transaction #2 then obtains an X-lock on the 1998 record in the materialized view, updates the 1998 record, commits and releases its U- and X-locks.

Consider Scenario #4a as a replacement for Scenario #4. Transaction #1 reads the materialized view, discovers the 1998 record exists, obtains an U-lock on the 1998 record in the materialized view, and computes the value for the 1998 record based on the current value in the materialized view and Transaction #1 transition values. Transaction #2 requests an U-lock on the 1998 record. Transaction #1 obtains an X-lock on the 1998 record in the materialized view, updates the 1998 record, commits and releases its U- and X-locks. Transaction #2 reads the materialized view, sees the 1998 record with the changes from Transaction #1, obtains an U-lock on the 1998 record in the materialized view, and computes the new value for the 1998 record based on the current value in the materialized view and Transaction #2 transition values. Transaction #2 obtains an X-lock on the 1998 record in the materialized view, updates the 1998 record, commits and releases the U- and X-locks. The use of the U-lock forces the execution pattern of Scenario #3a.

LOGIC OF THE OPTIMIZATION TEHNIQUE

Figure 5:
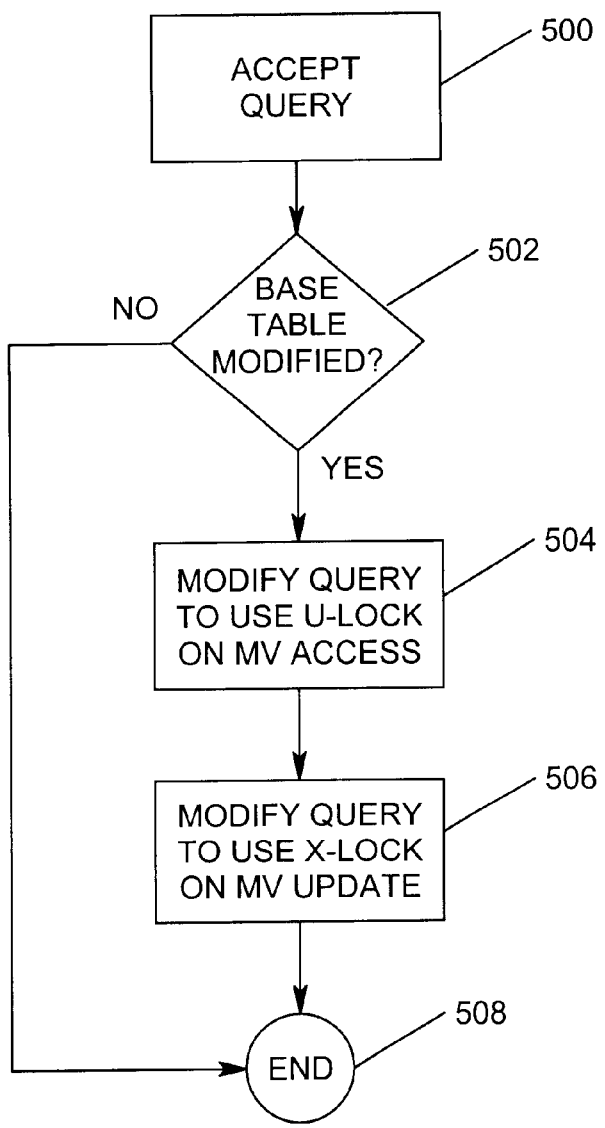
FIG. 5 is a flowchart illustrating the method of optimizing SQL queries according to the preferred embodiment of the present invention.

FIG. 5 is a flowchart illustrating the method of optimizing SQL queries in step 204 of FIG. 2 and step 314 of FIG. 3 according to the preferred embodiment of the present invention. Note that the term "query"as referred to herein is intended to cover any access to data, including updates, deletes, and inserts, as well as the simple retrieval of data.

Block 500 represents the computer system 100, specifically an optimizer function of the RDBMS software, accepting a query.

Block 502 is a decision block that represents the computer system 100 determining whether the query modifies a base table of a materialized view. If this is the case, then the materialized view should be accessed, to identify affected records therein, using at least one mechanism (such as an isolation level or appropriate locks) to guarantee consistency while avoiding deadlocks with other transactions that modify the base table of the materialized view and to improve concurrency with other transactions that are accessing the materialized view when the modification to the base table is applied to the materialized view. As a result, if the result of decision block 502 is true, then control transfers to Block 504; otherwise, control transfers to Block 510.

Block 504 represents the computer system 100 modifying the query to use either a U-lock or an X-lock on the record of the materialized view being modified, prior to the query accessing the record.

Block 506 represents the computer system 100 modifying the query to use an X-lock on the record of the materialized view being modified, prior to the query modifying the record.

Note also that, after a commit or rollback is performed at the end of the transaction, the U-lock and/or the X-lock are released.

Finally, Block 508 terminates the logic.

CONCLUSION

This concludes the description of the preferred embodiment of the invention. The following describes some alternative embodiments for accomplishing the present invention. For example, any type of computer, such as a mainframe, minicomputer, or personal computer, could be used with the present invention. In addition, any software program, other than an RDBMS or DBMS, using materialized views or summary tables could benefit from the present invention.

In summary, the present invention discloses a method, apparatus, and article of manufacture for maintaining a materialized view derived from at least one base table in a database stored on a computer. An update is performed to the base table in a transaction. Thereafter, the materialized view is accessed to identify affected records therein using at least one mechanism, such as an isolation level or update- and exclusive-locks, to guarantee consistency while avoiding deadlocks with other transactions that modify at least one base table of the materialized view and to improve concurrency with other transactions that are accessing the materialized view when the modification to the base table is applied to the materialized view.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method of maintaining a materialized view derived from at least one base table in a database stored on the computer, the method comprising:

(a) performing a modification to the base table in a transaction; and (b) accessing the materialized view to identify affected records therein using at least one mechanism to guarantee consistency while avoiding deadlocks with other transactions that modify at least one base table of the materialized view and to improve concurrency with other transactions that are accessing the materialized view when the modification to the base table is applied to the materialized view.

2. The method of claim 1 above, wherein the modification is selected from a group comprising an update, delete and insert.

3. The method of claim 1 above, wherein the accessing step comprises performing an outerjoin between the materialized view and the modification to the base table to identify the affected records.

4. The method of claim 3 above, further comprising modifying the identified affected records in the materialized view incrementally using the modification to the base table.

5. The method of claim 1 above, wherein the mechanism to guarantee consistency is selected from a group comprising an isolation level and at least one lock.

6. The method of claim 5 above, wherein the isolation level comprises repeatable read isolation.

7. The method of claim 5 above, wherein the lock comprises an exclusive lock when the materialized view is accessed.

8. The method of claim 5 above, wherein the lock comprises an update lock when the materialized view is accessed.

9. The method of claim 8 above, wherein the lock comprises an exclusive lock when the materialized view is modified.

10. The method of claim 9 above, further comprising:

(1) examining and using next-key locking in the materialized view while determining that the modification to the base table results in a new record being inserted to the materialized view; and (2) when the modification to the base table results in the new record being inserted into the materialized view, creating the new record using the modification to the base table, escalating the update lock to the exclusive lock, and inserting the new record into the materialized view, wherein the exclusive lock is released upon completion of the insert.

11. The method of claim 9 above, further comprising:

(1) examining and locking the materialized view to determine whether the modification to the base table results in an existing record being updated in the materialized view; and (2) when the modification to the base table results in the existing record being updated in the materialized view, creating new values for the existing record using the modification to the base table, escalating the update lock to the exclusive lock for the existing record, and updating the existing record in the materialized view, wherein the exclusive lock is released upon completion of the update.

12. The method of claim 9 above, further comprising:

(1) examining and locking the materialized view to determine whether the modification to the base table results in an existing record being deleted from the materialized view; and (2) when the modification to the base table results in the existing record being deleted from the materialized view, escalating the update lock to the exclusive lock, and deleting the existing record from the materialized view, wherein the exclusive lock is released upon completion of the deletion.

13. An apparatus for maintaining a materialized view, comprising:

(a) a computer system having a data storage device coupled thereto for storing a database, wherein the materialized view is derived from at least one base table stored in the database;

(b) logic, performed by the computer system, for:

(1) performing a modification to the base table in a transaction; and (2) accessing the materialized view to identify affected records therein using at least one mechanism to guarantee consistency while avoiding deadlocks with other transactions that modify at least one base table of the materialized view and to improve concurrency with other transactions that are accessing the materialized view when the modification to the base table is applied to the materialized view.

14. The apparatus of claim 13 above, wherein the modification is selected from a group comprising an update, delete and insert.

15. The apparatus of claim 13 above, wherein the logic for accessing comprises logic for performing an outerjoin between the materialized view and the modification to the base table to identify the affected records.

16. The apparatus of claim 15 above, further comprising logic for modifying the identified affected records in the materialized view incrementally using the modification to the base table.

17. The apparatus of claim 13 above, wherein the mechanism to guarantee consistency is selected from a group comprising an isolation level and at least one lock.

18. The apparatus of claim 17 above, wherein the isolation level comprises repeatable read isolation.

19. The apparatus of claim 17 above, wherein the lock comprises an exclusive lock when the materialized view is accessed.

20. The apparatus of claim 17 above, wherein the lock comprises an update lock when the materialized view is accessed.

21. The apparatus of claim 20 above, wherein the lock comprises an exclusive lock when the materialized view is modified.

22. The apparatus of claim 21 above, further comprising logic for:

(1) examining and using next-key locking in the materialized view while determining that the modification to the base table results in a new record being inserted to the materialized view; and (2) when the modification to the base table results in the new record being inserted into the materialized view, creating the new record using the modification to the base table, escalating the update lock to the exclusive lock, and inserting the new record into the materialized view, wherein the exclusive lock is released upon completion of the insert.

23. The apparatus of claim 21 above, further comprising logic for:
(1) examining and locking the materialized view to determine whether the modification to the base table results in an existing record being updated in the materialized view; and
(2) when the modification to the base table results in the existing record being updated in the materialized view, creating new values for the existing record using the modification to the base table, escalating the update lock to the exclusive lock for the existing record, and updating the existing record in the materialized view, wherein the exclusive lock is released upon completion of the update.

24. The apparatus of claim 21 above, further comprising logic for:
(1) examining and locking the materialized view to determine whether the modification to the base table results in an existing record being deleted from the materialized view; and
(2) when the modification to the base table results in the existing record being deleted from the materialized view, escalating the update lock to the exclusive lock, and deleting the existing record from the materialized view, wherein the exclusive lock is released upon completion of the deletion.

25. An article of manufacture embodying logic for performing a method of maintaining a materialized view derived from at least one base table in a database stored on the computer, the method comprising:
(a) performing a modification to the base table in a transaction; and
(b) accessing the materialized view to identify affected records therein using at least one mechanism to guarantee consistency while avoiding deadlocks with other transactions that modify at least one base table of the materialized view and to improve concurrency with other transactions that are accessing the materialized view when the modification to the base table is applied to the materialized view.

26. The method of claim 25 above, wherein the modification is selected from a group comprising an update, delete and insert.

27. The method of claim 25 above, wherein the accessing step comprises performing an outerjoin between the materialized view and the modification to the base table to identify the affected records.

28. The method of claim 27 above, further comprising modifying the identified affected records in the materialized view incrementally using the modification to the base table.

29. The method of claim 25 above, wherein the mechanism to guarantee consistency is selected from a group comprising an isolation level and at least one lock.

30. The method of claim 29 above, wherein the isolation level comprises repeatable read isolation.

31. The method of claim 29 above, wherein the lock comprises an exclusive lock when the materialized view is accessed.

32. The method of claim 29 above, wherein the lock comprises an update lock when the materialized view is accessed.

33. The method of claim 32 above, wherein the lock comprises an exclusive lock when the materialized view is modified.

34. The method of claim 33 above, further comprising:
(1) examining and using next-key locking in the materialized view while determining that the modification to the base table results in a new record being inserted to the materialized view; and
(2) when the modification to the base table results in the new record being inserted into the materialized view, creating the new record using the modification to the base table, escalating the update lock to the exclusive lock, and inserting the new record into the materialized view, wherein the exclusive lock is released upon completion of the insert.

35. The method of claim 33 above, further comprising:
(1) examining and locking the materialized view to determine whether the modification to the base table results in an existing record being updated in the materialized view; and
(2) when the modification to the base table results in the existing record being updated in the materialized view, creating new values for the existing record using the modification to the base table, escalating the update lock to the exclusive lock for the existing record, and updating the existing record in the materialized view, wherein the exclusive lock is released upon completion of the update.

36. The method of claim 33 above, further comprising:
(1) examining and locking the materialized view to determine whether the modification to the base table results in an existing record being deleted from the materialized view; and
(2) when the modification to the base table results in the existing record being deleted from the materialized view, escalating the update lock to the exclusive lock, and deleting the existing record from the materialized view, wherein the exclusive lock is released upon completion of the deletion.

* * * * *